United States Patent
Becker et al.

(10) Patent No.: US 7,670,389 B2
(45) Date of Patent: Mar. 2, 2010

(54) USE OF POLYMERS BASED ON MODIFIED POLYAMINES AS ADDITIVES FOR DETERGENTS

(75) Inventors: Heike Becker, Mannheim (DE); Volker Braig, Weinheim-Luetzelsachsen (DE); Lidcay Herrera Taboada, Ludwigshafen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 195 days.

(21) Appl. No.: 11/814,545

(22) PCT Filed: Jan. 24, 2006

(86) PCT No.: PCT/EP2006/050409

§ 371 (c)(1),
(2), (4) Date: Jul. 23, 2007

(87) PCT Pub. No.: WO2006/079626

PCT Pub. Date: Aug. 3, 2006

(65) Prior Publication Data

US 2008/0194449 A1 Aug. 14, 2008

(30) Foreign Application Priority Data

Jan. 26, 2005 (DE) .................. 10 2005 003 715

(51) Int. Cl.
*B08B 3/04* (2006.01)
*C11D 1/00* (2006.01)
*C11D 3/37* (2006.01)

(52) U.S. Cl. ..................... 8/137; 510/326; 510/350; 510/475; 510/499

(58) Field of Classification Search ............. 510/326, 510/350, 475, 499; 8/137
See application file for complete search history.

(56) References Cited

U.S. PATENT DOCUMENTS

| 3,686,128 A | 8/1972 | Werdehausen et al. | |
|---|---|---|---|
| 3,737,385 A * | 6/1973 | Werdehausen et al | 510/375 |
| 4,797,223 A | 1/1989 | Amick et al. | |
| 5,641,855 A * | 6/1997 | Scherr et al. | 528/310 |
| 2005/0176897 A1* | 8/2005 | Kanzaki et al. | 525/418 |

FOREIGN PATENT DOCUMENTS

| DE | 1 812 166 | 6/1970 |
|---|---|---|
| DE | 42 44 194 | 6/1994 |
| EP | 0 147 745 | 7/1985 |
| EP | 0 768 370 | 4/1997 |
| EP | 1 561 769 | 8/2005 |
| JP | 2003-286344 | * 10/2003 |
| JP | 2004-002589 | 1/2004 |
| WO | WO 97/42292 | 11/1997 |
| WO | WO 97/42293 | 11/1997 |
| WO | WO 2005/073357 | 8/2005 |

OTHER PUBLICATIONS

Database WPI, Section Ch, Week 200249, Derwent Publications Ltd., London, GB; AN 2004-307828, XP002374829, JP 2004-002589 (Jan. 8, 2004).

Database WPI, Section Ch, Week 200421, Derwent Publications Ltd., London, GB; AN 2004-217439, XP002374734, JP 2003-286344 (Oct. 10, 2003).

* cited by examiner

*Primary Examiner*—Brian P Mruk
(74) *Attorney, Agent, or Firm*—Oblon, Spivak, McClelland, Maier & Neustadt, L.L.P.

(57) ABSTRACT

The use of water-soluble or water-dispersible polymers obtainable by reaction of
(a) polyalkylenepolyamines, polyamidoamines or ethyleneimine-grafted polyamidoamines or mixtures thereof,
(b) if desired at least bifunctional crosslinkers and
(c) monoethylenically unsaturated carboxylic acids, salts, esters, amides or nitriles of monoethylenically unsaturated carboxylic acids, chlorocarboxylic acids and/or glycidyl compounds,
said component (a) having an average molecular weight $M_w$ in the range from 20 000 to 2 000 000 and the molar ratio of the hydrogen atoms on the nitrogen in said component (a) to said component (b) being in the range from 1:0.7 to 1:0.9, as a laundry detergent additive.

16 Claims, No Drawings

USE OF POLYMERS BASED ON MODIFIED POLYAMINES AS ADDITIVES FOR DETERGENTS

The present invention relates to the use of polymers obtainable by reaction of
(a) polyalkylenepolyamines, polyamidoamines or ethyleneimine-grafted polyamidoamines or mixtures thereof,
(b) if desired at least bifunctional crosslinkers and
(c) monoethylenically unsaturated carboxylic acids, salts, esters, amides or nitriles of monoethylenically unsaturated carboxylic acids, chlorocarboxylic acids and/or glycidyl compounds,
said component (a) having an average molecular weight Mw, in the range from 20 000 to 2 000 000 and the molar ratio of the hydrogen atoms on the nitrogen in said component (a) to said component (c) being in the range from 1:0.7 to 1:0.9, as a laundry detergent additive.

The invention further relates to laundry detergent formulations comprising these polymers as an additive.

Important tasks to be performed by the laundry detergent used in the machine washing of textile materials is to disperse the particulate materials arising in the wash in the wash liquor and to prevent the deposition of these materials on the textile material. The materials to be dispersed are in particular soil from the textile materials, such as pigmentary or clayey soil; the lime formed with the hardness ions from the tapwater; and the lime soaps formed with the hardness ions of the tapwater by soaps included in the laundry detergent.

Soaps are water soluble salts of long-chain fatty acids; in particular the alkali metal salts, especially salts of sodium and potassium, and ammonium salts of saturated and unsaturated aliphatic $C_8$-$C_{24}$-carboxylic acids. Examples of soaps are the sodium and potassium salts of aliphatic $C_{10}$-$C_{18}$-carboxylic acids, especially soaps derived from tallow and palm oils and having $C_{16}$-$C_{18}$-carboxylic acid moieties and soaps derived from coconut and palm kernel oils and having $C_{10}$-$C_{14}$-carboxylic acid moieties.

Soaps are in particular a constituent of liquid laundry detergent formulations, where they are employed as a surfactant (i.e., as a detersive substance), as a builder (i.e., to sequester the alkaline earth metal ions responsible for water hardness) and also as foam regulators. High water hardnesses cause lime soaps to form which deposit on the textile material as well as elsewhere.

Liquid laundry detergent lime soap dispersants described include copolymers of maleic acid with hydrophobic monomers, such as diisobutene, limonene, linalool and/or styrene (EP-A-768 370), and also homopolymers based on acrylic acids esterified with polyalkylene glycols and copolymers thereof with acrylamidosulfonic acids (EP-A-147 745, U.S. Pat. No. 4,797,223).

WO-A-97/42292 and 97/42293 describe laundry detergents comprising polymers based on ethoxylated polyethyleneimines, the nitrogen atoms of which may additionally be quaternized and/or oxidized, as cotton soil release additives.

DE-A-18 12 166 concerns laundry detergents comprising reaction products of polyethyleneimine with acrylic acid which have an average molecular weight in the range from 500 to 200 000 and also a degree of conversion for the amino groups in the range from 50 to 100%, as an ingredient. The examples utilize products having different molecular weights, but the respective degrees of conversion are not disclosed.

JP-A-2004-2589 describes laundry detergents comprising reaction products of polyethyleneimines with acrylic acid or acrylic acid and maleic acid to prevent redeposition of particulate soil. The average molecular weight $M_w$ of the polyethyleneimine used in the examples is not more than 7500, the amount of unsaturated carboxylic acid is not more than 65 mol %, based on the total amount of nitrogen atoms in the polyethyleneimine.

JP-A-2003-286 344 describes, for the same purpose, similar reaction products of polyethyleneimine and acrylic and maleic acid which, however, still have lower average molecular weights $M_w$ and only in one exceptional case a degree of conversion of 72%, based on the total amount of nitrogen atoms in the polyethyleneimine, but otherwise significantly lower degrees of conversion.

The present invention had for its object to provide polymers useful as dispersants for particulate materials arising in the wash, in particular for dispersing lime soaps.

We have found that this object is achieved by the use of polymers obtainable by reaction of
(a) polyalkylenepolyamines, polyamidoamines or ethyleneimine-grafted polyamidoamines or mixtures thereof,
(b) if desired at least bifunctional crosslinkers and
(c) monoethylenically unsaturated carboxylic acids, salts esters, amides or nitriles of monoethylenically unsaturated carboxylic acids, chlorocarboxylic acids and/or glycidyl compounds,
said component (a) having an average molecular weight $M_w$ in the range from 20 000 to 2 000 000 and the molar ratio of the hydrogen atoms on the nitrogen in said component (a) to said component (b) being in the range from 1:0.7 to 1:0.9, as a laundry detergent additive.

The polymers to be used according to the present invention are described in WO-A-05/73357, which was unpublished at the priority date of the present invention, and used in hard surface cleaners.

The polymers are obtainable by reaction of the components (a), if desired (b) and (c). They can thus be present in crosslinked or uncrosslinked form, but in either case the component (a) was modified with the component (c).

When component (b) is used, components (a) and (b) are preferably employed in a molar ratio in the range from 100:1 to 1:1000 and more preferably in the range from 20:1 to 1:20. The molar ratio of the components (a) and (c) is so chosen that the molar ratio of the hydrogen atoms on the nitrogen in (a) to component (c) is in the range from 1:0.7 to 1:0.9, preferably in the range from 1:0.75 to 1:0.85.

The polymers to be used according to the present invention are most preferably incipiently crosslinked polymers, i.e., up to 2%, preferably up to 1.5% and more preferably up to 1% of the active N—H bonds comprised in component (a) have been reacted with a crosslinker (b).

Component (a) is selected from polyalkylenepolyamines polyamidoamines or ethyleneimine-grafted polyamidoamines, which each have an average molecular weight $M_w$ in the range from 20 000 to 2 000 000, preferably in the range from 20 000 to 1 000 000 (determined in each case by light scattering) or mixtures thereof.

Polyalkylenepolyamines shall herein be understood to be referring to compounds comprising 3 or more nitrogen atoms, such as diethylenetriamine, triethylenetetramine, tetraethylenepentamine, pentaethylenehexamine, diaminopropyleneethylenediamine, trisaminopropylamine and polyethyleneimines.

The polyalkylenepolyamines may be in a partially amidated state. Products of this kind are prepared for example by reaction of polyalkylenepolyamines with carboxylic acids, carboxylic esters, carboxylic anhydrides or carbonyl halides. Amidated polyalkylene-polyamines are preferably amidated to an extent in the range from 1% to 30% and more preferably in the range up to 20% for the subsequent reactions. They still need to possess free N—H groups in order that they may be reacted with the compounds (b) and (c). Suitable carboxylic acids for amidating the polyalkylenepolyamines are saturated and unsaturated aliphatic or aromatic carboxylic acids having generally 1 to 28 carbon atoms, examples being formic acid, acetic acid, propionic acid, benzoic acid, lauric acid, palmitic acid, stearic acid, oleic acid, linoleic acid and behenic acid. Amidation by reacting the polyalkylenepolyamines with alkyldiketenes is also possible, of course.

The polyalkyleneamines can also be used in partly quaternized form as component (a). Useful quaternizing agents include for example alkyl halides, such as methyl chloride, ethyl chloride, butyl chloride, epichlorohydrin and hexyl chloride, dialkyl sulfates, such as dimethyl sulfate and diethyl sulfate, and also benzyl chloride. When quaternized polyalkylenepolyamines are used as component (a), their degree of quaternization is preferably in the range from 1% to 30% and more preferably up to 20%.

The polyamidoamines likewise useful as component (a) are obtainable for example by reaction of $C_4$-$C_{10}$-dicarboxylic acids with polyalkylenepolyamines, which preferably comprise from 3 to 10 basic nitrogen atoms in the molecule. Useful dicarboxylic acids include for example succinic acid, maleic acid, adipic acid, glutaric acid, suberic acid, sebacic acid or terephthalic acid. It is also possible to use mixtures of carboxylic acids, for example mixtures of adipic acid with glutaric acid or adipic acid. Adipic acid is preferably used for preparing the polyamidoamines. Useful polyalkylenepolyamines for condensing with dicarboxylic acids were mentioned above, examples of useful polyalkylenepolyamines being diethylenetriamine, triethylenetetramine, dipropylenetriamine, tripropylenetetramine, dihexamethylenetriamine, aminopropylethylenediamine and bis-aminopropylethylenediamine. The polyalkylenepolyamines can also be used in the form of mixtures to prepare polyamidoamines. The polyamidoamines are preferably prepared in the absence of any solvent, but may also be prepared, if appropriate, in inert solvents. The condensation of the dicarboxylic acids with the polyalkylenepolyamines is effected at elevated temperatures, for example in the range from 120 to 220° C. The water of reaction is distilled out of the reaction mixture. The condensation may, if appropriate, be carried out in the presence of lactones or lactams of carboxylic acids having from 4 to 8 carbon atoms. The amount of polyalkylene polyamine used is generally in the range from 0.8 to 1.4 mol per mole of dicarboxylic acid. The polyamidoamines thus obtainable have primary and secondary NH groups and are soluble in water.

Component (a) may likewise be an ethyleneimine-grafted polyamidoamine. Ethyleneimine-grafted polyamidoamines are preparable by the action of ethyleneimine on the above-described polyamidoamines in the presence of Brönstedt or Lewis acids, examples being sulfuric acid, phosphoric acid or boron trifluoride etherate. Ethyleneimine becomes grafted onto the polyamidoamine under the conditions described. For instance, from 1 to 10 ethyleneimine units can be grafted on per basic nitrogen grouping in the polyamidoamine.

Polyalkylenepolyamines are preferred for use as component (a). Particular preference is given to polyalkylenepolyamines, in particular polyethyleneimines, having an average molecular weight $M_w$ in the range from 20 000 to 2 000 000, especially in the range from 20 000 to 1 000 000 and in particular in the range from 20 000 to 750 000.

At least bifunctional crosslinkers useful as component (b) have a halohydrin, glycidyl aziridine or isocyanate unit or a halogen atom as functional groups.

Useful crosslinkers include for example epihalohydrins, preferably epichlorohydrin, and also α,ω-bis(chlorohydrin) polyalkylene glycol ethers and the α,ω-bisepoxides (of polyalkylene glycol ethers) obtainable therefrom by treatment with bases. The chlorohydrin ethers are preparable for example by reacting polyalkylene glycols and epichlorohydrin in a molar ratio in the range from 1:2 to 1:5. Useful polyalkylene glycols include for example polyethylene glycols, polypropylene glycols and polybutylene glycols and also block copolymers of $C_2$-$C_4$-alkylene oxides. The average molecular weights $M_w$ of the polyalkylene glycols are generally in the range from 100 to 6000 and preferably in the range from 300 to 2000. α,ω-Bis(chlorohydrin)polyalkylene glycol ethers are described in U.S. Pat. No. 4,144,123 for example. The last reference also states that the bisglycidyl ethers are obtainable by treating the corresponding dichlorohydrin ethers with bases.

Useful crosslinkers further include α,ω-dichloropolyalkylene glycols as disclosed for example in EP-A-025 515. These α,ω-dichloropolyalkylene glycols are obtainable by reacting dihydric, trihydric or tetrahydric alcohols, preferably alkoxylated dihydric, trihydric or tetrahydric alcohols, either with thionyl chloride by HCl elimination and subsequent catalytic decomposition of the chlorosulfonated compounds by elimination of sulfur dioxide, or with phosgene by HCl elimination to form the corresponding bischlorocarbonic esters and their subsequent catalytic decomposition by elimination of carbon dioxide.

The dihydric, trihydric or tetrahydric alcohols are preferably ethoxylated and/or propoxylated glycols which have been reacted with from 1 to 100 and in particular from 4 to 40 mol of ethylene oxide per mole of glycol.

Useful crosslinkers further include α,ω- or vicinal dichloroalkanes, examples being 1,2-dichloroethane, 1,2-dichloropropane, 1,3-dichloropropane, 1,4-dichlorobutane and 1,6-dichlorohexane.

Useful crosslinkers are further obtainable by reacting at least trihydric alcohols with epichlorohydrin in such a way that the products of the reaction comprise at least two chlorohydrin units. Useful polyhydric alcohols include for example glycerol, ethoxylated or propoxylated glycerols, polyglycerols having from 2 to 15 glycerol units in the molecule and also polyglycerols which may be ethoxylated and/or propoxylated if appropriate. Crosslinkers of this kind are known for example from DE-A-29 16 356.

Useful crosslinkers further include those comprising blocked isocyanate groups, an example being trimethylhexamethylene diisocyanate blocked with 2,2,3,6-tetramethyl-4-piperidinone. These crosslinkers are known for example from DE-A-40 28 285.

Useful crosslinkers further include those comprising aziridine units and based on polyethers or substituted hydrocarbons, an example being 1,6-bis(N-aziridino)hexane.

It will be appreciated that mixtures of to or more crosslinkers can also be used.

Preferred components (b) are epihalohydrins, in particular epichlorohydrin, α,ω-bis(chlorohydrin)polyalkylene glycol ethers, α,ω-bis(epoxide)s of polyalkylene glycol ethers and bisglycidyl ethers of polyalkylene glycols.

Component (c) is selected from monthethylenically unsaturated carboxylic acids, their salts, esters, amides or nitriles, chlorocarboxylic acids or glycidyl compounds or mixtures thereof.

Monoethylenically unsaturated carboxylic acids useful as component (c) preferably comprise from 3 to 13 carbon atoms in the alkenyl radical. Examples of particularly useful carboxylic acids are acrylic acid, methacrylic acid, dimethacrylic acid, ethylacrylic acid, allylacetic acid, vinylacetic acid, maleic acid, fumaric acid, itaconic acid, methylenemalonic acid, citraconic acid, oleic acid and linolenic acid. Of these, acrylic acid, methacrylic acid and maleic acid are preferred.

Especially the alkali metal, alkaline earth metal and ammonium salts of these carboxylic acids are useful as component (c) when salts of these carboxylic acids are used. The sodium, potassium and ammonium salts are preferred. The ammonium salts can be derived not only from ammonia but also from amines or amine derivatives such as ethanolamine, diethanolamine or triethanolamine. Especially the magnesium and calcium salts are useful as alkaline earth metal salts.

Monoethylenically unsaturated carboxylic esters useful as component (c) are derived in particular from monohydric $C_1$-$C_{20}$-alcohols or dihydric $C_2$-$C_6$-alcohols. Examples of particularly useful esters are methyl(meth)acrylate, ethyl (meth)acrylate, n-propyl(meth)acrylate, isopropyl(meth) acrylate, n-butyl(meth)acrylate, isobutyl(meth)acrylate, 2-ethylhexyl acrylate, 2-ethylhexyl methacrylate, palmityl (meth)acrylate, lauryl(meth)acrylate, stearyl(meth)acrylate, dimethyl maleate, diethyl maleate, isopropyl maleate, 2-hydroxyethyl(meth)acrylate, 2-hydroxypropyl(meth)acrylate, 3-hydroxypropyl(meth)acrylate, hydroxybutyl(meth)acrylate and hydroxyhexyl(meth)acrylate.

Monoethylenically unsaturated carboxamides useful as component (c) include for example (meth)acrylamide and oleamide and also the reaction products of these carboxylic acids, in particular of (meth)acrylic acid, with amidoalkanesulfonic acids. Particularly useful amides have the formulae II or II

  I

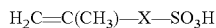  II in each of which X is a chemical bond or one of the spacer groups —C(O)—NH—[CH$_{2-n}$(CH$_3$)$_n$]—(CH$_2$)$_m$—, —C(O) NH— or —C(O)—NH—[CH(CH$_2$CH$_3$)]—, where n is from 0 to 2 and m is from 0 to 3.

Particular preference is given to 1-arylamido-1-propanesulfonic acid (formula I: X=—C(O)—NH—[CH (CH$_2$CH$_3$)]—), 2-acrylamido-1-propanesulfonic acid (formula I: X=—C(O)—NH—[CH(CH$_3$)]—CH$_2$—), 2-acrylamido-2-methyl-1-propanesulfonic acid (formula I: X=—C(O)—NH—[C(CH$_3$)$_2$]—CH$_2$—), 2-methacrylamido-2-methyl-1-propane-sulfonic acid (formula II: X=—C(O)—NH—[C(CH$_{3)2}$]—CH$_2$—) and vinylsulfonic acid (formula I: X=chemical bond).

Especially acrylonitrile and methacrylonitrile are finally monethylenically unsaturated carboxylic acid nitriles useful as component (c).

Compounds useful as component (c) further include chlorocarboxylic acids, which preferably comprise from 2 to 5 carbon atoms and up to 2 chlorine atoms. Particularly useful examples are chloroacetic acid, 2-chloropropionic acid, 2-chlorobutyric acid, dichloroacetic acid and 2,2'-dichloropropionic acid.

Compounds useful as component (c) further include glycidyl compounds of the formula III

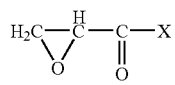  III where: X is —NH$_2$, -OM or —OR;
M is H, Na, K or ammonium;
R is $C_1$-$C_4$-alkyl or $C_2$-$C_4$-hydroxyalkyl.

Preferred compounds of the formula III are glycidic acid, its sodium, potassium ammonium, magnesium and calcium salts, glycidamide and glycidic esters, such as methyl glycidate, ethyl glycidate, n-propyl glycidate, n-butyl glycidate, isobutyl glycidate, 2-ethylhexyl glycidate, 2-hydroxypropyl glycidate and 4-hydroxybutyl glycidate. Particular preference is given to glycidic acid, its sodium, potassium and ammonium salts and also glycidamide.

Particular preference for use as component (c) is given to monoethylenically unsaturated carboxylic acid, in particular acrylic acid, methacrylic acid and maleic acid, of which acrylic acid is most preferred.

The water-soluble or water-dispersible polymers to be used according to the present invention are preparable by commonly known methods. Useful methods of preparation are described for example in DE-A-42 44 194, where either component (a) is initially reacted with component (c) before component (b) is added, or components (c) and (b) are concurrently reacted with component (a).

Preferably, however, the polymers are prepared by component (a) first being incipiently crosslinked with component (b) (step i)) and then reacted with component (c) (step ii)).

The crosslinking (step i)) can be carried out in a known manner. Typically, the crosslinker (b) is used as an aqueous solution, so that the reaction takes place in aqueous solution. The reaction temperature is generally in the range from 10 to 200° C. and preferably in the range from 30 to 100° C. The reaction Is typically carried out at atmospheric pressure. The reaction times depend on the employed components (a) and (b) and range in general from 0.5 to 20 h and in particular from 1 to 10 h. The product obtained may be isolated or preferably be reacted directly, in the form of the as-obtained solution, in step ii).

In step ii), the product obtained in step i) is reacted in the manner of a Michael addition with those compounds of group (c) which comprise a monoethylenically unsaturated double bond, whereas chlorocarboxylic acids and glycidyl compounds of the formula III react via the chlorine group or via the epoxide group with the primary or secondary amino groups of the incipiently crosslinked product obtained in step i). The reaction is typically carried out in aqueous solution at from 10 to 200° C. and preferably at from 30 to 100° C., and under atmospheric pressure. The reaction time depends on the components used and generally ranges from 5 to 100 h and in particular from 1 to 50 h.

The polymers which, according to the present invention, are to be used in laundry detergents act as dispersants for the particulate materials arising in the wash.

The particulate materials may be lime soaps formed by the interaction of the laundry detergent and hard tapwater; lime formed from the hardness ions of tapwater; or soil particles from the textiles to be washed, an example being pigmentary soil due to the coloring constituents of tea, coffee, red wine, fruit and fruit juices, vegetables and grass and also cosmetic products; or clay minerals.

The polymers to be used according to the present invention have particular importance with regard to the dispersing of lime soaps.

The polymers are therefore more preferably used in liquid laundry detergents, although their dispersing effect with regard to all particulate materials makes them interesting for solid laundry detergents also.

The present invention further provides liquid laundry detergent formulations comprising in particular (A) from 0.05% to 20% by weight of at leas one polymer according to the invention,
from 0.05% to 50% by weight of at least one nonionic, anionic, cationic and/or amphoteric surfactant,
(C) from 0% to 25% by weight of at least one soap,
(D) from 0% to 30% by weight of a nonsoap builder system,
(E) from 0% to 80% by weight of other customary ingredients, such as sodium carbonate enzymes, perfume, complexers, corrosion inhibitors, bleaches, bleach activators, bleach catalysts, dye transfer inhibitors, soil antiredeposition agents, optical brighteners, soil release polyesters, fiber and color protectants, silicones, dyes, bactericides, foam regulators, organic solvents, solubilizers, hydrotropes, thickeners and/or alkanolamines, and
(F) from 0% to 99.45% by weight of water.

Solid laundry detergent formulations of the present invention preferably have the following composition:
(A) from 0.05% to 20% by weight of at east one polymer according to the invention,
(B) from 0.5% to 40% by weight of at least one nonionic, anionic, cationic and/or amphoteric surfactant,
(C) from 0% to 25% by weight of at least one soap,
(D) from 0% to 60% by weight of a nonsoap builder system
(E) from 0% to 60% by weight of other customary ingredients, such as silicones, enzymes, perfume, complexers, corrosion inhibitors, bleaches, bleach activators, bleach catalysts, dye transfer inhibitors, soil antiredeposition agents, optical brighteners, soil release polyesters, fiber and color protectants, silicones, dyes, bactericides, foam regulators, dissolution improvers and/or disintegrants,
said components (A) to (E) summing to 100% by weight.

The solid laundry detergent formulations of the present invention may be present in powder, granule, extrudate or tablet form.

Useful nonionic surfactants (B) include in particular:
Alkoxylated $C_8$-$C_{22}$-alcohols, such as fatty alcohol alkoxylates, oxo process alcohol alkoxylates and Guerbet alcohol ethoxylates: the alkoxylation can be effected with ethylene oxide, propylene oxide and/or butylene oxide. Block copolymers or random copolymers can be present. They typically comprise from 2 to 50 mol and preferably from 3 to 20 mol of at least one alkylene oxide per mole of alcohol. Ethylene oxide is the preferred alkylene oxide. The alcohols preferably have from 10 to 18 carbon atoms.
Alkylphenol alkoxylates, in particular alkylphenol ethoxylates, comprising $C_6$-$C_{14}$-alkyl chains and from 5 to 30 mol of alkylene oxide/mol.
Alkylpolyglucosides comprising $C_8$-$C_{22}$-alkyl chains, preferably $C_{10}$-$C_{18}$-alkyl chains, and generally from 1 to 20 and preferably from 1.1 to 5 glucoside units.
N-Alkylglucamides, fatty acid amide alkoxylates, fatty acid alkanolamide alkoxylates and also block copolymers of ethylene oxide, propylene oxide and/or butylene oxide.

Useful anionic surfactants include for example:
Sulfates of (fatty) alcohols having from 8 to 22 and preferably from 10 to 18 carbon atoms, in particular $C_9C_{11}$-alcohol sulfates, $C_{12}C_{14}$-alcohol sulfates, $C_{12}$-$C_{18}$-alcohol sulfates, lauryl sulfate, cetyl sulfate, myristyl sulfate, palmityl sulfate, stearyl sulfate and tallow fatty alcohol sulfate.
Sulfated alkoxylated $C_8$-$C_{22}$-alcohols (alkyl ether sulfates): compounds of this kind are prepared for example by first alkoxylating a $C_8$-$C_{22}$-alcohol, preferably a $C_{10}$-$C_{18}$-alcohol, for example a fatty alcohol, and then sulfating the alkoxylation product. The alkoxylation is preferably carried out using ethylene oxide.
Linear $C_8$-$C_{20}$-alkylbenzenesulfonates (LAS), preferably linear $C_9$-$C_{13}$-alkylbenzenesulfonates and -alkyltoluenesulfonates.
Alkanesulfonates, in particular $C_8$-$C_{24}$- and preferably $C_{10}$-$C_{16}$-alkanesulfonates.
Soaps, such as the sodium and potassium salts of $C_8$-$C_{24}$-carboxylic acids.

Anionic surfactants are preferably included in the laundry detergent in the form of salts. Useful salts here include for example alkali metal salts, such as sodium, potassium and lithium salts, and ammonium salts, such as hydroxyethylammonium, di(hydroxyethyl)ammonium and tri(hydroxyethyl) ammonium salts.

Particularly useful cationic surfactants are:
$C_7$-$C_{25}$-Akylamines;
N,N-Dimethyl-N-(hydroxy-$C_7$-$C_{25}$-alkyl)ammonium salts;
alkylatatingly quaternized mono- and di($C_7$-$C_{25}$-alkyl) dimethylammonium compounds;
ester quats, in particular quaternary esterified mono-, di- and trialkanolamines esterified with $C_8$-$C_{22}$-carboxylic acids;
imidazoline quats, in particular 1-alkylimidazolinium salts of the formulae IV or V

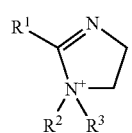

IV

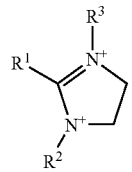

V in each of which:
$R^1$ is $C_1$-$C_{25}$-alkyl or $C_2$-$C_{25}$-alkenyl;
$R^2$ is $C_1$-$C_4$-alkyl or hydroxy-$C_1$-$C_4$-alkyl;
$R^3$ is $C_1$-$C_4$-alkyl, hydroxy-$C_1$-$C_4$-alkyl or a radical $R^1$—(CO)—X—$(CH_2)_p$—(X:—O— or —NH—; p: 2 or 3),
subject to the proviso that at least one $R^1$ radical is $C_7$-$C_{22}$-alkyl.

Useful amphoteric surfactants include for example alkylbetaines, alkylamidebetaines, aminopropionates, aminoglycinates and amphoteric imidazolium compounds.

Useful inorganic builders are in particular:
Crystalline and amorphous aluminosilicates having ion-exchanging properties, in particular zeolites: various types of zeolites are useful, in particular zeolites A, X, B, P, MAP and HS in their sodium form or in forms in which sodium is partly replaced by other cations such as lithium, potassium, calcium, magnesium or ammonium.
Crystalline silicates, in particular disilicates and sheet-silicates, for example δ- and β-$Na_2Si_2O_5$. Silicates can be used in the form of their alkali metal, alkaline earth metal or ammonium salts, preference being given to the sodium, lithium and magnesium silicates.

Amorphous silicates, such as sodium metasilicate and amorphous disilicate.

Carbonates and bicarbonates: these can be used in the form of their alkali metal, alkaline earth metal or ammonium salts. Preference is given to sodium, lithium and magnesium carbonates and bicarbonates, in particular sodium carbonate and/or sodium bicarbonate.

Polyphosphates, such as pentasodium triphosphate.

Useful organic cobuilders include in particular:

Low molecular weight carboxylic acids, such as citric acid, hydrophobically modified citric acid, for example agaric acid, malic acid, tartaric acid, gluconic acid, glutaric acid, succinic acid, iminodisuccinic acid, oxydisuccinic acid, propanetricarboxylic acid, butanetetracarboxylic acid, cyclopentanetetracarboxylic acid, alkyl- and alkenylsuccinic acids and aminopolycarboxylic acids, examples being nitrilotriacetic acid, β-alaninediacetic acid, ethylenediaminetetraacetic acid, serinediacetic acid, isoserinediacetic acid, N-(2-hydroxyethyl)iminodiacetic acid, ethylenediaminedisuccinic acid and methyl- and ethylglycinediacetic acid.

Oligomeric and polymeric carboxylic acids, such as homopolymers of acrylic acid and aspartic acid, oligomaleic acids, copolymers of maleic acid with acrylic acid, methacrylic acid or $C_2$-$C_{22}$-olefins, for example isobutene or long-chain α-olefins, vinyl $C_1$-$C_8$-alkyl ethers, vinyl acetate, vinyl propionate, (meth)acrylic esters of $C_1$-$C_8$-alcohols and styrene. Preference is given to using the homopolymers of acrylic acid and copolymers of acrylic acid with maleic acid. Oligomeric and polymeric carboxylic acids are used in acid form or as sodium salt.

Useful bleaches include for example adducts of hydrogen peroxide with inorganic salts, such as sodium perborate monohydrate, sodium perborate tetrahydrate and sodium carbonate perhydrate, and percarboxylic acids, such as phthalimidopercaproic acid.

Useful bleach activators include for example N,N,N',N'-tetraacetylethylenediamine (TAED), sodium p-nonanoyloxybenzenesulfonate and N-methylmorpholinioacetonitrile methosulfate.

Enzymes preferably used in laundry detergents are proteases, lipases, amylases, cellulases oxidases and peroxidases.

Useful dye transfer inhibitors include for example homo, co and graft polymers of 1-vinylpyrrolidone, 1-vinylimidazole or 4-vinylpyridine N-oxide, Homo- and copolymers of 4-vinylpyridine which have been reacted with chloroacetic acid are likewise useful as dye transfer inhibitors.

Besides, laundry detergent ingredients are commonly known. Detailed descriptions are to be found for example in WO-A-99/06524 and 99/04313; in Liquid Detergents, Editor: Kuo-Yann Lai, Surfactant Sci. Ser., Vol. 67, Marcel Decker, New York, 1997, p. 272-304.

EXAMPLES

I. Preparation of Polymers to be Used According to the Present Invention

Polymer 1

196 g of anhydrous polyethyleneimine ($M_w$: 25 000; Lupasol® WF; BASF) were placed, under a nitrogen atmosphere, in a four-neck flask equipped with metal stirrer and reflux condenser and were diluted to 25% by weight with 588 g of water. After heating to 70° C. with stirring, 40 ml of a 22% by weight aqueous solution of a crosslinker (reaction product of polyethylene glycol ($M_w$: 1 500) with epichlorohydrin a molar ratio of 1:2) are speedily added. After five hours of subsequent stirring at 70° C. and further heating to 80° C., 263.2 g of acrylic acid were added dropwise at 80° C. over 3 h. This was followed by 1 h of stirring at 80° C.

After cooling, a viscous, yellowish orange polymer solution having a solids content of 42% by weight was obtained. The polymer had a K value of 17 (measured in 1% by weight aqueous solution at 25° C.) and had a degree of conversion of 80%, based on the N—H bonds in the polyethyleneimine.

Polymer 2

350 g of polyethyleneimine (56%, $M_w$: 25 000; Lupasol HF) were placed, under a nitrogen atmosphere, in a four-neck flask equipped with metal stirrer and reflux condenser and were diluted with 456 g of water. After heating to 70° C. with stirring, 18 ml of a 50% by weight aqueous solution of a crosslinker (reaction product of polyethylene glycol ($M_w$: 660) with epichlorohydrin a molar ratio of 1:2) are speedily added. After five hours of subsequent stirring at 70° C. and further heating to 80° C., 259.4 g of acrylic acid were added dropwise at 80° C. over 3 h. This was followed by 1 h of stirring at 95° C.

After cooling, a viscous, yellowish orange polymer solution having a solids content of 44.1% was obtained. The polymer had a K value of 23.1 (measured in 1% by weight aqueous solution at 25° C.) and had a degree of conversion of 80%, based on the N—H bonds in the polyethyleneimine.

Comparative Polymer V1

The preparation of polymer 1 was repeated, except that only 50% of the N—H bonds were reacted with acrylic acid.

Comparative Polymer V2

The preparation of polymer 2 was repeated, except that only 55% of the N—H bonds were reacted with acrylic acid.

II.a. Use of Prepared Polymers in Laundry Detergents

To test their incrustation-inhibiting performance, 5% by weight of the respective polymer (active) was added to three different liquid laundry detergents. The compositions of these laundry detergents is reported in table 1.

Cotton test cloths (BW 283, from Reichenbach, Einbeck and also EMPA 211, Swiss Materials Testing institute, St. Gallen, Switzerland, were then washed under the washing conditions recited in table 2.

After 15-fold washing, the ash content of the test cloth, which is a measure of the inorganic deposits on the textile material, was determined by ashing at 700° C.

The results obtained are compiled in tables 3a and b. For comparison, the cotton cloth was also washed in each case with the laundry detergents comprising no polymer.

TABLE 1

Composition of laundry detergents

|  | LD1 [% by wt.] | LD2 [% by wt.] | LD3 [% by wt.] |
| --- | --- | --- | --- |
| Linear alkylbenzenesulfonate (50%) | 10 | 5 | — |
| $C_{13}C_{15}$ oxo process alcohol × 7 EO | 25 | 25 | 26 |
| $C_{12}$ fatty alcohol sulfate × 2 EO | — | — | 6.1 |
| Coconut fatty acid | 10 | 15 | 14.3 |
| Potassium hydroxide | 4.8 | 7 | 5.4 |
| Sodium carbonate | — | — | 1.4 |
| Sodium citrate × 2 $H_2O$ | — | 2 | 4.1 |
| Propylene glycol | — | 8 | — |
| Polypropylene glycol 600 | 2 | — | — |

TABLE 1-continued

Composition of laundry detergents

|  | LD1 [% by wt.] | LD2 [% by wt.] | LD3 [% by wt.] |
|---|---|---|---|
| Ethanol | 5 | — | 2 |
| Isopropanol | 3 | — | — |
| Water | ad 100 | ad 100 | ad 100 |

TABLE 2

Washing conditions

| Apparatus | Launder-o-meter from Atlas, Chicago, USA |
|---|---|
| Wash liquor | 250 ml |
| Washing time | 30 min at 60° C. |
| Washing cycles | 15 |
| Detergent dosage | 6 g/l |
| Water hardness | 8 mmol/l Ca:Mg = 4:1 |
| Liquor ratio | 12.5:1 |
| Test cloth | BW 283 cotton cloth |

TABLE 3a

Results (BW 283 test cloth)

Ash content [% by wt.]

|  | LD1 | LD2 | LD3 |
|---|---|---|---|
| No polymer | 4.7 | 3.8 | 4.3 |
| Polymer 1 | 3.9 | 1.6 | 1.7 |
| Polymer 2 | 3.5 | 1.7 | — |
| Polymer V1 | 5.0 | 3.6 | — |
| Polymer V2 | 4.8 | 3.9 | — |

TABLE 3a

Results (EMPA 211 test cloth)

Ash content [% by wt.]

|  | LD1 | LD2 | LD3 |
|---|---|---|---|
| No polymer | 3.3 | 2.0 | 2.3 |
| Polymer 1 | 2.0 | 1.4 | 1.9 |

These results show that the ash content and hence the inorganic fabric deposits are distinctly reduced on using the inventive polymers 1 and 2.

IIb. Checking the Deposit-Inhibiting Action

A mixture of 15 ml of a 0.5% by weight aqueous sodium oleate solution and 15 ml of a 1% by weight aqueous solution of polymer 1 or 2 was made up to 60 ml with completely ion-free water in a 100 ml glass beaker. A glass plate (3.5×7.5 cm) was then suspended in the stirred solution for 1 min. This was followed by the addition of 30 ml of completely ion-free water to which 750 ppm of calcium and 250 ppm of magnesium in the form of the chlorides had been added, and the entire mixture was stirred for a further 5 min.

The glass plate was then removed from the solution and visually inspected. For comparison, instead of the polymer solutions, a corresponding amount of completely ion-free water was used.

Whereas the tests with polymer solution left only a very thin fine film behind on the glass plate, the glass plate of the comparative test bore a thick crystalline deposit.

We claim:

1. A process for producing a water-soluble or water-dispersible polymer comprising reacting components
   (a) one or more polyalkylenepolyamines, polyamidoamines, ethyleneimine-grafted polyamidoamines, or mixtures thereof,
   (b) one or more crosslinkers having at least bifunctionality, and
   (c) one or more monoethylenically unsaturated carboxylic acids, salts, esters, amides or nitriles of monoethylenically unsaturated carboxylic acids, chlorocarboxylic acids, glycidyl compounds, or mixtures thereof,
   wherein said component (a) has an average molecular weight $M_w$ ranging from 20,000 to 2,000,000,
   wherein the molar ratio of the total number of hydrogen atoms bonded to nitrogen in said component (a) to said component (c) ranges from 1:0.7 to 1:0.9, and
   wherein component (a) is reacted with component (b) to crosslink, and the reaction product thereof is then reacted with component (c).

2. The process according to claim 1, wherein said component (a) is a polyalkyleneimine.

3. The process according to claim 1, wherein said component (b) is a bifunctional crosslinker having one or both functional groups selected from a halohydrin, a glycidyl, an aziridine, an isocyanate, and a halogen atom.

4. The process according to claim 1, wherein said component (c) is a monoethylenically unsaturated carboxylic acid.

5. The process according to claim 1, further comprising reacting up to 2% of active N—H bonds present in said component (a) with said component (b).

6. A method of dispersing one or more particulate materials in a wash, said method comprising adding said water-soluble or water-dispersible polymer produced by the process according to claim 1 as a laundry detergent additive to said wash.

7. The method according to claim 6, wherein said one or more particulate materials are selected from soil, stain, and mixtures thereof.

8. The method according to claim 6, wherein said one or more particulate materials are selected from lime soap, lime, and mixtures thereof.

9. A laundry detergent formulation comprising said water-soluble or water-dispersible polymer according to claim 1 as an additive.

10. A liquid laundry detergent formulation comprising components
    (A) from 0.05% to 20% by weight of at least one of said water-soluble or water-dispersible polymer according to claim 1,
    (B) from 0.5% to 50% by weight of at least one nonionic, anionic, cationic and/or amphoteric surfactant,
    (C) from 0% to 25% by weight of at least one soap,
    (D) from 0% to 30% by weight of a nonsoap builder system,
    (E) from 0% to 80% by weight of one or more customary ingredients selected from sodium carbonate, enzymes, perfume, complexers, corrosion inhibitors, bleaches, bleach activators, bleach catalysts, dye transfer inhibitors, soil antiredeposition agents, optical brighteners, soil release polyesters, fiber and color protectants, silicones, dyes, bactericides, foam regulators, organic solvents, solubilizers, hydrotropes, thickeners and/or alkanolamines, and
    (F) from 0% to 99.45% by weight of water.

11. A solid laundry detergent formulation comprising components
   (A) from 0.05% to 20% by weight of at least one of said water-soluble or water-dispersible polymer according to claim 1,
   (B) from 0.5% to 40% by weight of at least one nonionic, anionic, cationic and/or amphoteric surfactant,
   (C) from 0% to 25% by weight of at least one soap,
   (D) from 0% to 60% by weight of a nonsoap builder system, and
   (E) from 0% to 60% by weight of one or more customary ingredients selected from silicones, enzymes, perfume, complexers, corrosion inhibitors, bleaches, bleach activators, bleach catalysts, dye transfer inhibitors, soil antiredeposition agents, optical brighteners, soil release polyesters, fiber and color protectants, silicones, dyes, bactericides, foam regulators, dissolution improvers and/or disintegrants,
   wherein the combined weight percent of said components (A) to (E) is 100% by weight.

12. The process according to claim 1, wherein the molar ratio of component (a) to component (c) ranges from 1:0.75 to 1:0.85.

13. The process according to claim 1, wherein the molar ratio of component (a) to component (b) ranges from 100:1 to 1:1000.

14. The process according to claim 1, wherein the molar ratio of component (a) to component (b) ranges from 20:1 to 1:20.

15. The process according to claim 5, wherein up to 1.5% of active N—H bonds present in said component (a) is reacted with said component (b).

16. The process according to claim 5, wherein up to 1% of active N—H bonds present in said component (a) is reacted with said component (b).

* * * * *